United States Patent [19]

Gillett et al.

[11] Patent Number: 4,616,485
[45] Date of Patent: Oct. 14, 1986

[54] TEMPERATURE CONTROLLER FOR AN AIR CONDITIONING APPARATUS

[75] Inventors: Jimmie D. Gillett, Garland; Ronald E. Ellis, Flower Mound; Michael D. Robertson, Coppell, all of Tex.

[73] Assignee: Ranco Electronics Division, Irving, Tex.

[21] Appl. No.: 701,403

[22] Filed: Feb. 14, 1985

[51] Int. Cl.⁴ .............................................. F25B 1/00
[52] U.S. Cl. ..................................... 62/228.1; 361/22; 374/107; 165/11.1
[58] Field of Search ....................... 62/228.1, 229, 126, 62/129; 361/22; 374/107; 165/11 R; 236/49

[56] References Cited

U.S. PATENT DOCUMENTS

| | | | |
|---|---|---|---|
| 4,265,091 | 5/1981 | Kobayashi | 62/228.1 X |
| 4,467,616 | 8/1984 | Kitauchi | 62/229 X |
| 4,481,787 | 11/1984 | Lynch | 62/229 X |

Primary Examiner—William E. Wayner
Attorney, Agent, or Firm—Hubbard, Thurman, Turner & Tucker

[57] ABSTRACT

A temperature controller for an air conditioner including a temperature sensor that provides an output temperature from the air conditioning device, and a temperature rate of change comparison circuit for providing an indication signal that the rate of change from the temperature sensor exceeds a predetermined reference rate of change indicating that the rate of temperature change from the air conditioner is less than a reference cooling rate. The indication signal from the temperature rate of change comparison circuit is input to a disabling means that disables the air conditioning device. In an embodiment, the rate of change comparison circuit is connected to the thermostat for the system to sample the air conditioning temperatures for comparison with the reference cooling rate.

15 Claims, 6 Drawing Figures

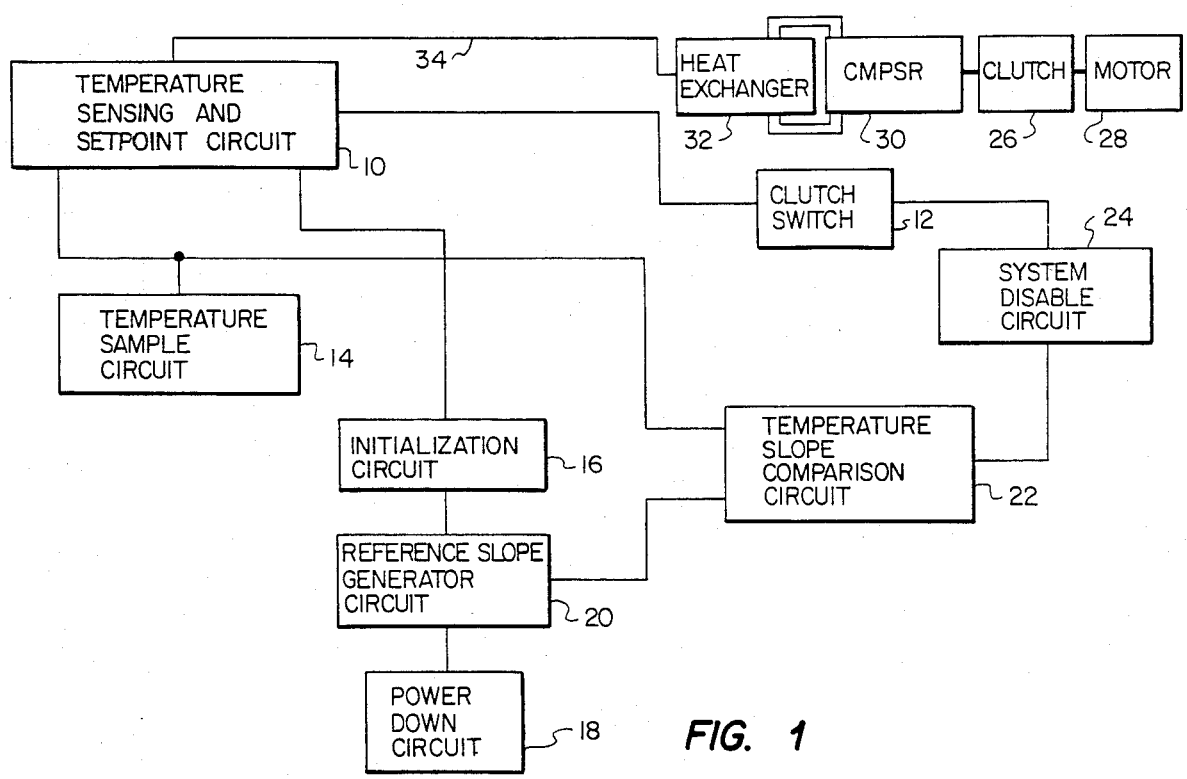
FIG. 1
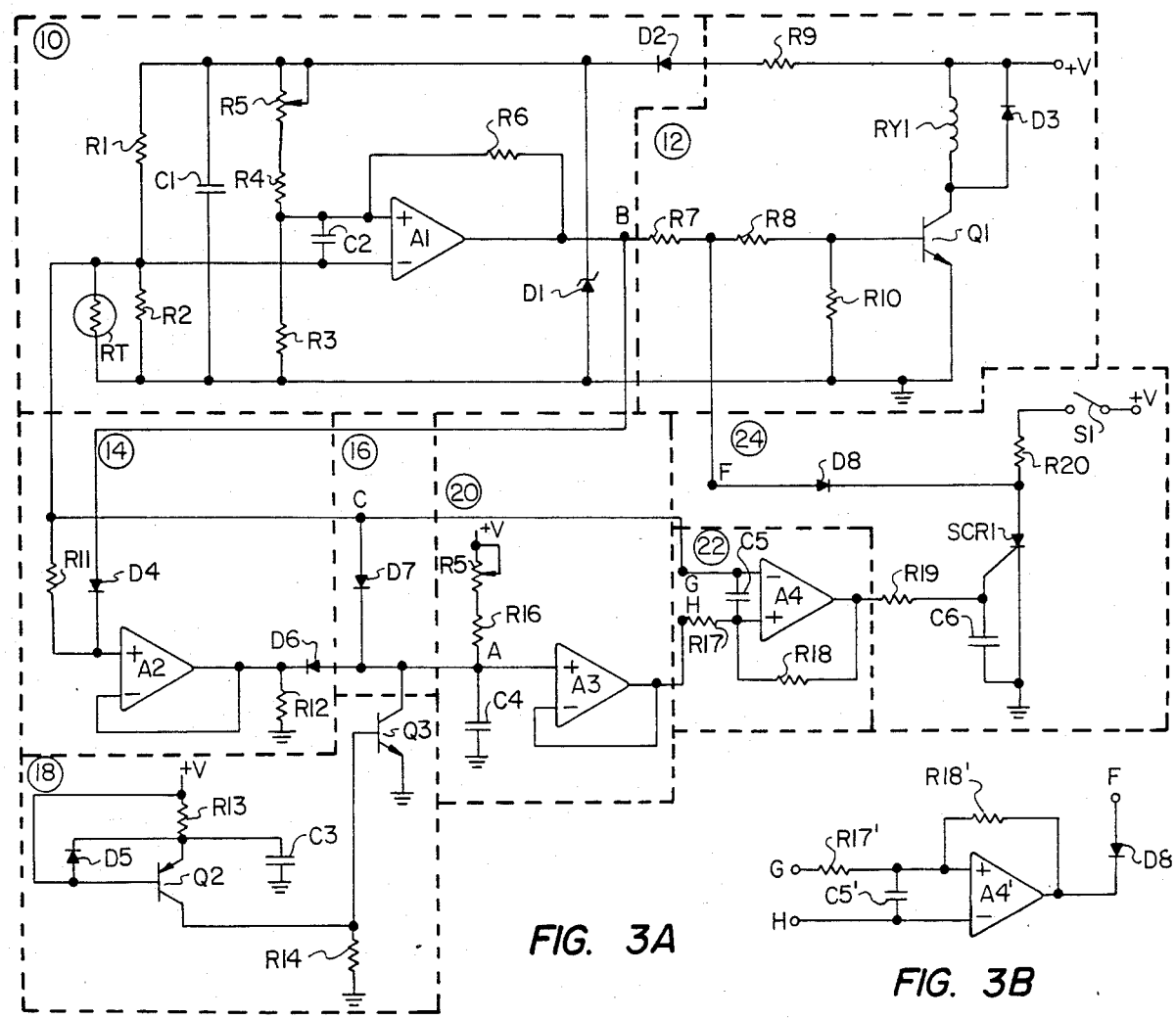
FIG. 3A
FIG. 3B

CLUTCH

TEMPERATURE CONTROLLER FOR AN AIR CONDITIONING APPARATUS

BACKGROUND OF THE INVENTION

1. Field of the Invention

This invention relates to temperature controlling devices for air conditioning systems and more specifically for temperature controlling devices that detect a loss of refrigerant or loss of cooling capability for an air conditioning device.

2. Description of the Prior Art

Air conditioning systems have traditionally included a thermostat switch that provides a hysterisis or cycling of the air conditioning unit when cooling an area. Specifically, the thermostat turns on the air conditioner until the air conditioner has cooled the area and a specific temperature has been achieved. At this point, when the temperature of the area is below a certain set value by the thermostat, the thermostat will turn off the air conditioning unit. The air conditioning unit will remain off until the cooled area warms up enough so that the temperature of the area reaches a second point which is detected by the thermostat. Upon reaching this second point, the thermostat turns on the air conditioning unit again to provide additional cooling. This "on/off" cycling is continued to provide cooling within a small temperature range.

If the air conditioner loses refrigerant or loses cooling capability, the air conditioning unit will continue to run even though adequate cooling is not occurring. If this condition is allowed to continue, energy is wasted. Furthermore, where a loss of refrigerant has occurred, the compressor of the air conditioner may be damaged.

Traditional means to detect a loss of charge or lack of cooling capability include temperature sensors and pressure sensors. Temperature sensors have been used to detect excessively high temperatures indicating a failure of the air conditioning cooling capability. Temperature sensors have also been used to detect levels of the refrigerant in a refrigerant reservoir. Pressure sensors have been used at points in the compressor line to detect the loss of charge by detecting a loss of pressure.

However, the use of temperature sensors or pressure sensors by themselves will only detect failures at absolute temperature or pressure values. Degradation of cooling capability will not be detected by these sensors until the specific value is reached.

It is an object of this invention to provide for the detection of loss of refrigerant charge or loss of cooling capability by detecting a decrease in the rate of cooling of the air conditioner device.

SUMMARY OF THE INVENTION

In accordance with the present invention, a temperature controller for an air conditioner is provided that includes a temperature sensor for indicating the output temperature from the air conditioner and a temperature rate of change comparison circuit that provides an indication signal indicating that the rate of change from the temperature sensor exceeds a predetermined limit in comparison with a reference rate of change. The indication signal is input to a disabling circuit for disabling the air conditioner upon receiving the indication signal.

In a preferred embodiment, the temperature rate of change comparison circuit includes a reference rate of change generator circuit that receives a sampled output temperature signal and provides a referenced rate of change signal as a function of the magnitude of this sampled output temperature signal and a function of time. In this embodiment, the reference signal is periodically adjusted in accordance with periodically received sample output temperature signals. Also, the disabling circuit, in one embodiment, is externally resetable. In this embodiment, the predetermined limit of the temperature rate of change comparison circuit is exceeded when the output temperature signal is equal to the reference rate of change signal. Thus, the reference rate of change signal, while representing a specific temperature magnitude, is derived from a predetermined reference cooling rate which when compared will indicate a failure of the air conditioning cooling capability.

In a second embodiment, a temperature controller for an air conditioner is provided that includes a temperature sensing circuit for providing a temperature signal that represents an output temperature from the air conditioning device and a temperature sampling circuit that provides a sample signal representing a sampled output temperature. This sample signal is input to a reference rate of change generation circuit that provides a reference signal having a predetermined rate of change. The reference signal and the temperature signal are input to a comparison circuit that provides a failure indication when the temperature signal has exceeded a predetermined limit in comparison to the reference signal. This indication signal is then input to a disabling circuit that disables the air conditioner response to the indication signal.

In this embodiment, the temperature sensor includes a thermistor. The temperature sampling circuit is connected to a temperature trip point detector circuit that initially provides a trip point signal until the output temperature is beyond a first temperature magnitude. The trip point signal is input to the temperature sampling circuit for designating the sampled output temperature. The temperature trip point detector circuit also provides a reinitiation of the trip point signal when the output temperature has reached a second temperature magnitude. The temperature trip point detector circuit is the electrical equivalent of a thermostat providing a hysterisis, (i.e. a low temperature point where the air conditioner is turned off and an upper trip point where the air conditioner is turned back on). In this embodiment, the temperature trip point detector circuit is connected to a switch that engages and disengages the air conditioner in response to the trip point signal. Further, this embodiment includes a reset capability to reset the disabling circuit after a failure has been detected. In another variation, the temperature controller will be reset during the power up sequence.

In a still further embodiment, a temperature controller including a loss of refrigerant charge detector is provided. The temperature controller includes a temperature sensor that provides a temperature signal representing an air conditioner output temperature. The temperature sensor is connected to a thermostat that provides an "On" signal until the output temperature is below a first temperature magnitude limit. At this point, the thermostat removes the "On" signal. This "On" signal remains removed until the thermostat detects that the output temperature has reached a second temperature magnitude. At this point, the thermostat again provides the "On" signal. In this embodiment, the thermostat output ("On" signal) is provided to a switch that engages and disengages the air conditioning device, thus providing the cooling temperature range or temperature hysterisis. The loss of refrigerant charge detector includes a temperature sample circuit that is connected to the temperature sensor and the thermostat and provides a single sampled temperature when the "On" signal is removed by the thermostat. This sample signal is used by a reference rate of change generation circuit that provides a reference signal that has a predetermined rate of change which represents a predetermined reference cooling rate. Therefore, the reference signal output is dependent upon the predefined time rate of change and the initial sampled temperature. The reference signal is output to a comparison circuit which compares the reference signal to the temperature signal. The comparison circuit provides a failure indication signal when the temperature signal has exceeded a predetermined limit in comparison with the reference signal. The failure signal is input to a disabling circuit that disables the air conditioning device upon receiving the failure indication signal. The disabling circuit in this embodiment will continue to disengage the air conditioning system until manually reset. In a variation, the disabling circuit will continue to disengage the air conditioner until powered down.

BRIEF DESCRIPTION OF THE DRAWINGS

The novel features believed characteristic of the invention are set forth in the claims. The invention itself, however, as well as other features and advantages thereof, will be best understood by reference to the detailed description which follows when read in conjunction with the accompanying drawings, wherein:

FIG. 1 is a block diagram of the temperature controller connected to an air conditioning system.

FIG. 3A is a schematic of the invention.

FIG. 3B is a schematic for a variation of the disabling circuit for the invention.

DETAIL DESCRIPTION OF THE PREFERRED EMBODIMENT

The present invention includes electrical circuitry that is used to detect a loss of freon charge in an air conditioner system. In one embodiment, the invention is implemented on the air conditioner system of an automobile. However, it should be understood that this invention is equally advantageous on any cooling system where loss of refrigerant decreases efficiency.

In simple terms, the present invention detects loss of freon charge in an air conditioner system by comparing electrically the rate of cooling with a reference rate of cooling. If the rate of actual cooling is too slow as compared to the reference rate of cooling, the compressor clutch of the automobile air conditioning system is disengaged to prevent any possible damage to the compressor unit.

Figure 2A:
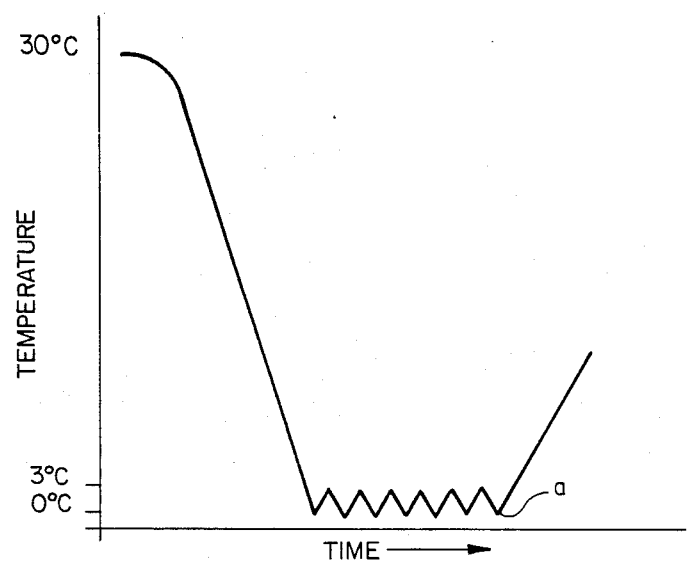
FIG. 2A is a graph illustrating a typical temperature versus time relationship for the operation of an air conditioning device.

FIG. 1 is a block diagram of the invention. The clutch switch 12 operates a relay which engages or disengages the clutch drive mechanism 26 for the compressor unit 30. In normal operation, the clutch switch 12 will cause the compressor drive mechanism 26 to engage the compressor 30 to provide cooling through the heat exchanger 32. When sufficient cooling has been provided, (as detected by a sensor in the heat exchanger 32 and connected via line 34) the clutch switch 12 will disengage the clutch 12 and the compressor 30 will remain disengaged until the temperature rises to a certain point whereby the clutch switch 12 again engages the clutch 26 of the compressor for additional cooling. A typical cycle for an air conditioning system is illustrated in graph form in FIG. 2A. Here the initial temperature is 30° C. when the compressor is initially engaged. The temperature then drops to approximately 0° C. where the compressor clutch is disengaged. When the temperature rises again to 3° C. the clutch mechanism reengages the compressor to provide additional cooling. This cycle continues to provide sufficient cooling. At point A of the graph of FIG. 2A, the temperature is rising to illustrate the loss of freon charge in an air conditioning system. FIG. 2A is a graph illustrating the cooling provided by the air conditioner in the preferred embodiment of this invention. The cycle represented by a saw tooth appearing signal, represents the cycling or hysterisis provided by a thermostat, or in this embodiment, the temperature sensing and set point circuit 10. In this embodiment, the temperature and sensing set point circuit provides for a hysterisis or temperature variation of 3° C.

The temperature of FIG. 2A is measured by the temperature sensing and set point circuit 10 of the invention. In this embodiment, the temperature sensing and set point circuit 10 provides for compressor activation via the clutch switch 12 until the cooling temperature reaches 0° whereby the compressor is disengaged. Upon sensing a temperature of 3° C. the clutch switch 12 is activated to reengage the compressor to provide additional cooling. This cycle continues over this 3° temperature range or hysteresis.

The invention also includes a temperature slope comparison circuit that compares the rate of cooling or slope resulting from the air conditioning system with a reference rate of cooling or slope. Specifically, the temperature slope comparison circuit 22 receives an input from the temperature sensing and set point circuit 10 representing the actual change of temperature from a sensor in the heat exchanger via line 34 and provides the actual slope of temperature change. Additionally, the temperature slope comparison circuit 22 receives a reference slope or reference temperature from the reference slope generator circuit 20. To insure that the reference slope begins at the appropriate point in relationship to the sensed temperature, the reference slope generator circuit 20 receives an input from the temperature sample circuit 14. Additionally, the reference slope generator circuit 20 includes an initialization circuit 16 to provide quick initialization of the reference slope output. Further, the power down circuit 18 is connected to the reference slope generator circuit 20 to provide a reinitialization to a known state after a power loss.

An output from the temperature slope comparison circuit 22 is an indication that the rate of change of temperature is less than the reference, meaning that the air conditioning system is not operating at the required efficiency. This output from the temperature slope comparison circuit 22 is input to the system disable circuit 24 which provides an input to the clutch switch 12 to disable the compressor 30 to prevent any possible damage to the compressor.

Figure 2B:
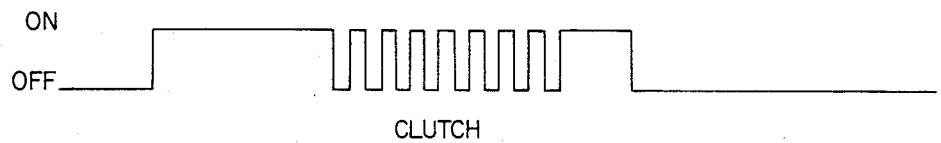
FIG. 2B is a signal diagram illustrating the operation of an air conditioner clutch in response to a thermostat.
Figure 2C:
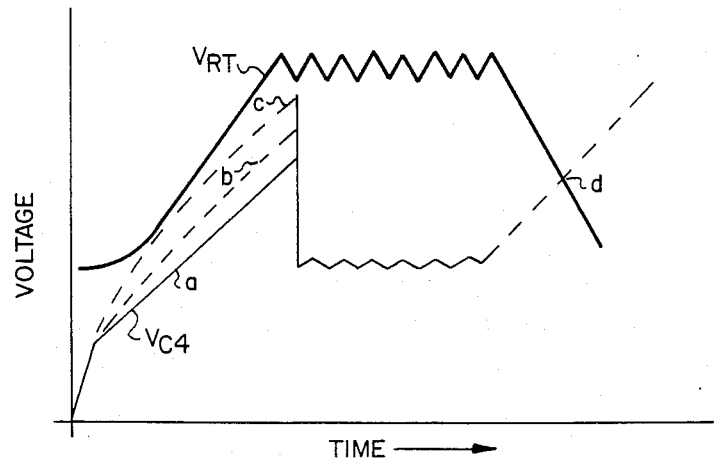
FIG. 2C is a graph illustrating the relation between voltage and time for the sensed temperature versus the reference temperature for the invention.

The appropriate operation of the output of the clutch switch 12 is shown in FIG. 2B as the cyclic operation of the air conditioner clutch 26 in response to the temperature outputs on the temperature sensing and set point circuit 10 as represented by the graph FIG. 2A. When the air conditioning system fails to cool as provided by the rising line (from point A) of the right side of FIG. 2A, FIG. 2B shows that the air conditioner clutch is on and the compressor is constantly running. The Applicant's invention, upon detecting such condition, will disengage the clutch and thus turn off the compressor to prevent any damage.

FIG. 3 illustrates the schematic of the invention. The clutch switch 12 is illustrated in FIG. 3 and is connected between a voltage V and ground. In the preferred embodiment, the voltage V is the voltage of the automobile power source, customarily 12 volts. The clutch switch 12 includes a transistor Q1 that is connected to a relay RY1 at its collector. Relay RY1 operates the mechanism to engage and disengage the clutch of the compressor. Diode D3 is provided across the coil of relay RY1 to permit de-energization of the coil without damage to transistor Q1. Additionally, transistor Q1 includes resistors R7 and R8 connected at its base with resistor R10 connected across the base to emitter junction. Transistor Q1 receives its input from the node B at the transistor base to control the operation of relay RY1.

The signal voltage at node B is the output of the temperature sensing and set point circuit 10 illustrated as including a comparator A1 with hysterisis feedback provided by resistor R6. The "+" of comparator A1 receives an input from the resistive network R5, R4 and R3. R5 is a variable resistor to provide the setting of the initial reference voltage. The "−" input to comparator A1 includes the resistor R1 in series with resistor R2 in parallel with the thermistor RT. Thermistor RT is a temperature sensitive resistor located at the heat exchanger. The "−" input to A1 provides the actual sensed temperature to comparator A1. The output of comparator A1 is the voltage that represents the signal to drive the clutch and in a normal operating condition will result in a saw tooth type (see FIG. 2A) output to the clutch switch 12. The comparator A1 further includes a transient suppressor capacitor C2 across the "+" and "−" inputs. Additionally, the temperature sensing and set points circuit 10 includes diode D1 and D2 and capacitor C1. Diode D2 prevents the improper reverse polarity connection of the voltage "V" from damaging the comparator circuit. The diode D1 is a zener diode in the preferred embodiment that is provided with capacitor C1 for power supply regulator.

The temperature sample circuit 14 is illustrated as including an operational amplifier A2 connected in a voltage follower configuration and in receiving inputs through resistor R11 from the thermistor RT and the voltage at node V through diode D4. Initially, the comparator A1 outputs a high signal which was forward biases diode D4 causing the input to operational amplifier A2 to be high and thus the output of operational amplifier A2 to be high. Since diode D6 will be reversed biased, the forward biasing of diode D4 effectively removes the sample circuit 14 from the configuration. Once the comparator A1 turns off, the input to operational amplifier A2 is the voltage across the thermistor RT through resistor R11 since diode D4 is now reversed biased.

The actual reference slope in the reference slope generator circuit 20 is provided by the voltage at node A which is a voltage across capacitor C4. Capacitor C4 is connected in series with a variable resistance R15 in a series with a resistor R16. Node A is also connected to the anode side of diode D6 and the positive input to an operational amplifier A3 that is configured as a voltage follower. The initialization circuit 16 is diode D7 the anode of which is connected to node C. Node C which is the voltage across the thermistor RT, is provided to allow a quick charge of capacitor C4 by bypassing the resistors R15 and R16 initially. Eventually, the voltage at node A will increase above the voltage from the thermistor RT causing diode D7 to reverse bias, effectively removing itself from the circuit. The reference slope generator circuit 20 is also provided with the power down circuit 18 that consists of a transistor Q3 connected to a network of resistors R13, R14, capacitor C3, diode D5 with transistor Q2. This power down circuit 20 operates in a manner that when the power voltage V is lost the capacitor C3 will continue to be charged causing a collector current from Q2 to turn on transistor Q3 resulting in a draining to ground the voltage from node A across C4. This power down circuit 18 insures that the initial state of voltage of node A across C4 is 0 volts.

The output of the operational amplifier A3 is the reference slope. This slope can be adjusted by variations in the variable resistor R15 (see lines a, b, c of FIG. 3C).

The temperature slope comparison circuit 22 includes the comparator A4 connected with feedback resistor R18 to the output of the voltage follower A3 through resistor R17 on the "+" input and the voltage at nodes C (or node G) on the "−" input across the transient suppressing capacitor C5. The comparator A4 compares the voltage increase across the thermistor RT with the voltage increase across the capacitor C4, if the voltage increase across the capacitor C4 is greater than the voltage increase across the thermistor RT then the output of the comparator A4 is high and drives the system disable circuit 24 which includes the silicon control rectifier SCR1 with its gate connected to the output to the temperature slope comparison circuit 22 through resistor R19. A positive voltage output from the comparator A4 will charge the capacitor C6 and hold SCR1 on resulting in a shorting of the base voltage of transistor Q1 of the clutch switch circuit 12 through diode D8 to ground. SCR1 will continue conducting until it is reset by switch S1. Upon shorting the base voltage of transistor Q1, the clutch will be disengaged by Relay RY1.

Another embodiment of the system disable circuit 24 is illustrated in the schematic of FIG. 3B. In this configuration, the temperature slope comparison circuit includes a comparator A4' configured with a transient suppressing capacitor C5 and feedback resistor R18 with input resistor R17 configured as shown connected to nodes G and H of the circuit of FIG. 3A. Node F is connected to the clutch switch 12 of FIG. 3A. In this configuration, the system disable circuit 24 merely consists of the diode D8. In normal operation, the output of comparator A4 reverse biases the diode D8. However, when the reference slope voltage exceeds the thermistor voltage VRT, diode D8 is forward biased draining the base voltage of transistor Q1 thus disengaging the clutch from the compressor. The difference between the system disable circuit 24' and the previously discussed system disable circuit 24 is that the system disable circuit 24' will be automatically reset when the circuit is powered down and powered up again.

Although preferred embodiments of this invention have been described in detail, it should be understood that various changes, alterations and substitutions may be made therein without departing from the scope and spirit of the invention as defined by the appended claims.

What is claimed is:

1. A temperature controller for an air conditioning device comprising:
    a temperature sensing means for providing an output temperature signal from the air conditioning device;
    a temperature rate of change comparison means for providing an indication signifying the rate of temperature change from the temperature sensing means exceeds a predetermined limit in comparison with a reference rate of temperature change; and
    disabling means for disabling the air conditioning device upon receiving the indication from the temperature rate of change comparison means.

2. A temperature controller according to claim 1 wherein said temperature rate of change comparison means includes a reference rate of change generator means for receiving a sampled output temperature signal and providing a rate of change signal as a function of the magnitude of the sampled output temperature signal.

3. A temperature controller according to claim 2 wherein said reference rate of change signal is time dependent.

4. A temperature controller according to claim 3 wherein said reference rate of change is periodically adjusted in accordance with periodically received sample output temperature signals.

5. A temperature controller according to claim 4 wherein said disabling means may be externally reset.

6. A temperature controller according to claim 5 wherein said predetermined limit is exceeded when the output temperature signal is equal to the reference rate of change signal.

7. A temperature controller for an air conditioning device comprising:
    a temperature sensing means for providing a temperature signal representing an output temperature from the air conditioning device;
    a temperature sampling means for providing a sample signal representing a sampled output temperature;
    a reference rate of change generation means for receiving said sample signal and providing a reference signal having a predetermined rate of change;
    comparison means for receiving said reference signal and said temperature signal and for providing a failure indication signal representing that the temperature signal has exceeded a predetermined limit in comparison with the reference signal; and
    disabling means for disabling the air conditioner device upon receiving the failure indication from the comparison means.

8. A temperature controller according to claim 7 wherein said temperature sensing means includes a thermistor 9.

9. A temperature controller according to claim 8 wherein said temperature sampling means is connected to a temperature trip point detector means for providing a trip point signal until the output temperature is beyond a first temperature magnitude, said trip point signal being input to said temperature sampling means for designating said sampled output temperature.

10. A temperature controller according to claim 9 wherein said temperature trip point detector means further provides said trip point signal when the output temperature is beyond a second temperature magnitude.

11. A temperature controller according to claim 10 wherein said temperature trip point detector means is connected to a switch means for engaging and disengaging the air conditioning device in response to said trip point signal.

12. A temperature controller according to claim 11 wherein said disabling means may be externally reset.

13. A temperature controller including a loss of refrigerant charge detector and further including a temperature sensor providing a temperature signal representing an air conditioner output temperature connected to a thermostat for providing an "On" signal until the output temperature is below a first temperature magnitude and providing the "On" signal when the output temperature reaches a second temperature magnitude, said thermostat connected to a switch for engaging and disengaging the air conditioning device, said loss of refrigerant charged detector comprising:
    a temperature sample means for providing a sample signal representing a sampled output temperature when the thermostat removes the "On" signal;
    a reference rate of change generation means for receiving said sample signal and providing a reference signal having a predetermined rate of change representing a predetermined reference cooling rate;
    comparison means for receiving said reference signal and said temperature signal and for providing a failure indication signal representing that the temperature signal has exceeded a predetermined limit in comparison with the reference signal; and
    disabling means for disabling the air conditioning device upon receiving the failure indication signal from the comparison means.

14. A temperature controller according to claim 13 wherein said disabling means may be externally reset.

15. A temperature controller according to claim 14 wherein said predetermined limit is exceeded when the output temperature signal is equal to the reference signal.

* * * * *